United States Patent [19]

Bach

[11] Patent Number: 4,780,038
[45] Date of Patent: Oct. 25, 1988

[54] CLAMP FOR FASTENING TUBES AND WIRES

[76] Inventor: Ivan Bach, N-4990, Sondeled, Norway

[21] Appl. No.: 928,711

[22] Filed: Nov. 7, 1986

Related U.S. Application Data

[63] Continuation of Ser. No. 645,707, Aug. 30, 1984, abandoned.

[30] Foreign Application Priority Data

Oct. 12, 1983 [NO] Norway .................................. 833706

[51] Int. Cl.$^4$ ............................................... F16B 15/02
[52] U.S. Cl. .................................... 411/461; 411/473;
411/920
[58] Field of Search ............... 411/457, 461, 463, 471,
411/473, 475, 477, 920, 462, 485; 248/71

[56] References Cited

U.S. PATENT DOCUMENTS

| | | | |
|---|---|---|---|
| 506,861 | 10/1893 | Prentice | 411/475 X |
| 538,322 | 4/1895 | Coupal | 411/920 X |
| 780,019 | 1/1905 | Arendt | 411/457 X |
| 951,393 | 3/1910 | Hahn | 411/920 X |
| 1,581,887 | 4/1926 | Taplin | 411/920 X |
| 1,697,456 | 1/1929 | Carlson | 411/461 |
| 2,121,422 | 6/1938 | Cheney | 411/461 |
| 2,174,708 | 10/1939 | Sears et al. | 411/920 X |
| 2,885,168 | 5/1959 | Silverman | 248/71 |
| 2,885,169 | 5/1959 | Thiel | 248/71 |
| 2,887,004 | 5/1959 | Stewart | 411/473 X |
| 3,117,758 | 1/1964 | Bauer | 411/461 X |
| 3,154,999 | 11/1964 | Stewart | 411/920 X |
| 3,279,300 | 10/1966 | Larson | 248/71 X |

FOREIGN PATENT DOCUMENTS

| | | | |
|---|---|---|---|
| 230336 | 7/1960 | Australia | 411/475 |
| 1121396 | 4/1956 | France | 411/475 |
| 218300 | 4/1942 | Switzerland | 411/457 |
| 264933 | 1/1927 | United Kingdom . | |
| 305003 | 1/1929 | United Kingdom . | |
| 477961 | 1/1938 | United Kingdom . | |
| 533987 | 2/1941 | United Kingdom . | |
| 642620 | 9/1950 | United Kingdom . | |
| 843061 | 8/1960 | United Kingdom . | |

Primary Examiner—Lloyd A. Gall
Attorney, Agent, or Firm—Fleit, Jacobson, Cohn & Price

[57] ABSTRACT

A clamp with a U-shaped head and nail-like legs is provided with embossments pressed out of the material in that portion of the head which is in alignment with the nail-like leg, the embossments protruding to at least the height of the top of the U-shaped head.

2 Claims, 1 Drawing Sheet

U.S. Patent  Oct. 25, 1988  4,780,038
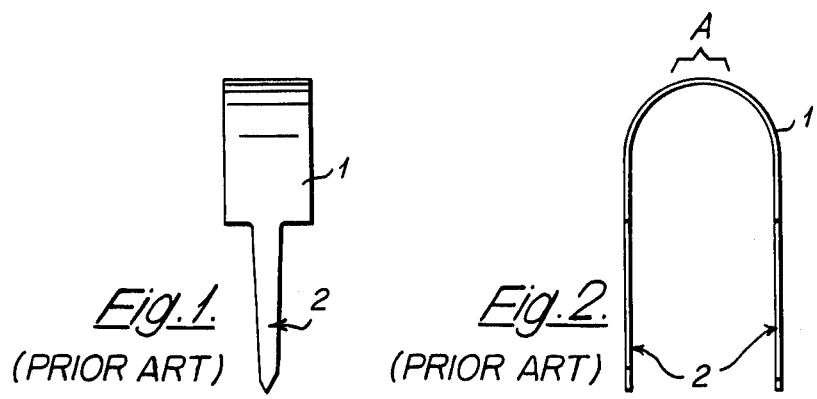
Fig.1. (PRIOR ART)
Fig.2. (PRIOR ART)
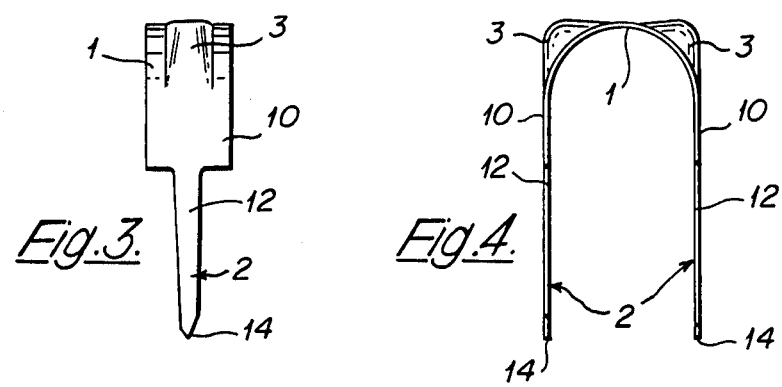
Fig.3.
Fig.4.
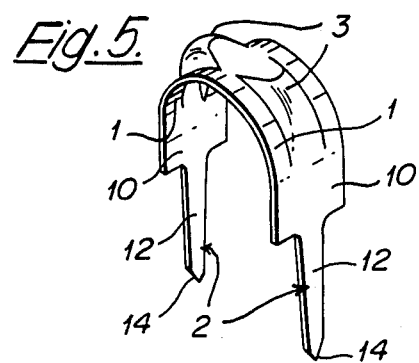
Fig.5.

CLAMP FOR FASTENING TUBES AND WIRES

This application is a continuation, of application Ser. No. 645,707, filed Aug. 30, 1984, now abandoned.

FIELD OF THE INVENTION

The present invention relates to a clamp for fastening tubes, wires, cables and other elongated objects to a base, wherein a U-shaped head is connected to at least one nail-like leg that is intended to be driven into the base using a suitable tool while the object is held and retained within the U-shaped head.

DESCRIPTION OF RELATED ART

Many different embodiments of clamps for this purpose are known in the art, having one or two nail-like legs and intended to be driven into the base singly, using a hammer or other striking tool, or by a gun or other power-driven tool. In the latter case, several clamps are normally arranged in a magazine and are more or less shot out of the power-driven tool.

The most practical shape for clamps of this type is the U-shape wherein the radius of the curved portion corresponds approximately to the radius of the tube, wire or cable, the U thus fitting closely around the tube or wire that is being secured.

The transfer of force between the striking tool, for example a hammer, and the U-shaped clamp is not satisfactory, however. The hammer must strike against the top of the reversed U and the force must then be transferred through the clamp's U-shaped portion down to the tip of the legs. Such clamps are made of relatively thin material, about 1 mm thick, and if the hammer strikes obliquely or if the base presents greater resistance to one leg than the other, the clamp may easily become deformed. It is then not only difficult to straighten the clamp, but the appearance of the clamp after straightening may not be satisfactory. Clamps of this type are often pre-lacquered, and even a minor slip causing deformation can cause the lacquer to crack and break away, further worsening the appearane of the clamp. Repeated bending to and fro to straighten out a clamp that has become deformed can also weaken the clamp, perhaps so much that it must be discarded. For this reason, clamps have been developed which have an opening in the alignment with each of the nail-like legs which fits around the force-exerting part of a tool in which the clamp is retained. Therefore, the force of the blow will be transferred directly to the leg in the longitudinal direction of the legs, permitting the clamp to be driven into the base satisfactorily while preventing accidental, non-uniform stresses on the clamp's U-shaped portion. This embodiment, however, has the very substantial drawback that it requires a special tool which may not always be available, for example on smaller installations or remodeling projects, and it is also necessary to have a separate tool for each separate size of clamp.

SUMMARY OF THE INVENTION

It is the object of the invention, therefore, to provide a clamp which offers the known advantages of prior art U-shaped clamps having one or two nail-like legs while avoiding the above-mentioned drawbacks, in that the transfer of force from a striking tool to the nail-like leg occurs directly and not through the clamp's U-shaped portion.

In accordance with the invention, this is achieved in that sections of material in the U-shaped portion of the clamp are pressed out in the form of a bead or boss-like extension of each nail-like leg, extending at least to the height of the head of the U. The embossments form protuberances or bosses against which the tool, for example a hammer, will strike. By aiming the hammer slightly to one side or the other, it is possible to drive one leg farther into the base than the other, if desirable, while if the blow is aimed at the top of the clamp, both bosses which are in alignment with the respective legs will be driven with equal force. In addition to ensuring a much more correct transfer or force from tool to clamp, the bosses will reinforce the U-shaped head of the clamp so that it is much more difficult to deform it should one leg encounter greater resistance than the other when the clamp is being driven into the base.

BRIEF DESCRIPTION OF THE DRAWINGS

The invention is characterized by the features disclosed in the appurtenant patent claims and will be described in greater detail in the following with reference to the accompanying drawings, wherein:

FIGS. 1 and 2 show a prior art clamp in side and front view, respectively,

FIGS. 3 and 4 show a clamp in accordance with the invention in side and front view, and FIG. 5 shows the clamp of the invention in perspective.

DETAILED DESCRIPTION

A prior art clamp of the pertinent type, as shown in FIGS. 1 and 2, consists of a U-shaped head 1 and (in the illustrated example) two nail-like legs 2 integral with the U-shaped head 1 and made of the same material, which may be 1-mm-thick sheet metal. As seen particularly in FIG. 2, clamps having a curvature adapted to a 15-mm-diameter tube, for example, are subjected to large stresses when, in order to drive the legs 2 into a wood base, one must hit the top of the U-shaped head 1 squarely, in the area A. An oblique blow may lead to deformation of the head 1, and if it is a cable that is being fastened with the clamp, the deformed part of the clamp can easily cut into the cable when the clamp is driven in further.

These drawbacks are avoided with the same type of clamp as shown in FIGS. 3 and 4, where a section 3 constituting a projection of each nail-like leg extends out from the U-shaped head as shown in FIG. 4. There are two sections 3 which project from a curved, planar surface generated by the crosspiece of U-shaped head 1. The two sections or bosses are located in the crosspiece and have two side edges spaced inwardly from two side edges of the crosspiece. The two bosses are spaced away from each other and taper at one end of their ends to merge with a plane generated by one of the two flat legs 2 which include a first portion 10 equal in width to the crosspiece of the head 1 and a second portion 12 tapering down from the first portion 10 to nail-like points 14. FIG. 5 shows the clamp even more clearly, and it may be seen that if one aims a blow at the top of the clamp, the tool will strike the stamped-out bosses 3 and the force of the blow will be transferred directly to the legs, the direction of propagation coinciding with the longitudinal direction of the nail-like leg 2. Therefore, the U-shaped head is substantially unaffected by any loading and the probability of deformation with an incorrect blow is substantially reduced. If the hammer strikes the bosses symmetrically, all is well and good, and if it strikes obliquely so that the blow exerts greater force on one boss than the other, this will merely cause one leg 2 to be driven harder into the wood than the other leg, which may in some cases even be desirable or planned, according to circumstances. The bosses which enable one to hit the clamp in alignment with the legs, in addition to ensuring a more correct transfer of force, will also reinforce the U-shaped head 1 so that it is more difficult to deform it even in extreme cases.

The illustrated example serves only to illustrate the invention and should not be construed as restricting the scope of protection provided by this patent. For example, it may be preferable in some situations to utilize clamps having only one nail-like leg, and even in such instances, the clamp of the invention provides advantages over the prior art.

Having described my invention, I claim:

1. A clamp with a striking surface for fastening tubes, wires, cables and other elongated objects to a base, said clamp comprising:

a flat piece of sheet metal being U-shaped and having two legs and a semi-circular crosspiece interconnecting said two legs, said crosspiece having two side edges and including only two bosses projecting from said crosspiece and separated from each other, each of said two bosses being spaced inwardly from said two side edges and being in alignment with a different one of said two legs, said two legs including a first portion of equal width as said crosspiece and a second portion tapering down from said first portion to terminate at one end in nail-like points, said first portion and said second portion of each of said two legs extending in a common flat plane, said two bosses extending above said two legs at least to the same height as a top portion of said crosspiece to provide a continuous, substantially flat striking surface with said top portion so that when a force is applied to at least one of said two bosses, said force is transferred directly to at least one of said two legs to drive said at least one of said two legs into the base for securing the elongated object to the base by the clamp.

2. A clamp for fastening tubes, wires, cables, and other elongated objects to a base, said clamp comprising:

a piece of sheet metal having an inner surface and an outer surface, said sheet metal being U-shaped and having two legs and a semi-circular crosspiece arcing to interconnect said two legs, said crosspiece having two side edges and two bosses separated from each other and projecting from said outer surface in said crosspiece, said two bosses being recessed from said inner surface in said crosspiece, each of said bosses being spaced inwardly from said two side edges and being in alignment with a different one of said two legs, said inner surface and said outer surface of said two legs extending in flat parallel planes, said two legs including a first portion of equal width as said crosspiece and a second portion tapering down from said first portion to terminate at one end in nail-like points, side edges of said first portion extending parallel to and continuously with said two side edges of said crosspiece and side edges of said second portion being spaced inwardly from said side edges of said first portion at a terminal end located opposite to said nail-like points and adjacent to said first portion, said bosses extending above said two legs at least to the same height as a top portion of said crosspiece and forming a continuous, substantially flat striking surface with said top portion so that when a force is applied to said bosses, said force is transferred directly to at least one of said two legs to drive said at least one of said two legs into the base for securing the elongated object to the base by the clamp.

* * * * *